(12) United States Patent
Hagen

(10) Patent No.: US 8,955,496 B2
(45) Date of Patent: Feb. 17, 2015

(54) FUEL SYSTEM

(75) Inventor: Harald Hagen, Creussen (DE)

(73) Assignee: Audi AG, Ingolstadt (DE)

( * ) Notice: Subject to any disclaimer, the term of this patent is extended or adjusted under 35 U.S.C. 154(b) by 342 days.

(21) Appl. No.: 13/328,343

(22) Filed: Dec. 16, 2011

(65) Prior Publication Data

US 2012/0180767 A1 Jul. 19, 2012

(30) Foreign Application Priority Data

Dec. 21, 2010 (DE) .......................... 10 2010 055 317

(51) Int. Cl.
*F02M 33/08* (2006.01)
*B60K 15/035* (2006.01)
*F02M 33/02* (2006.01)

(52) U.S. Cl.
CPC .............. *B60K 15/035* (2013.01); *F02M 33/08* (2013.01); *F02M 33/02* (2013.01)
USPC ......................................... 123/518; 123/519

(58) Field of Classification Search
USPC .......... 123/516–521, 698, 447; 137/587–589; 220/746
See application file for complete search history.

(56) References Cited

U.S. PATENT DOCUMENTS

| | | | | |
|---|---|---|---|---|
| 5,137,002 A * | 8/1992 | Mahoney et al. | ............. | 123/516 |
| 5,579,740 A * | 12/1996 | Cotton et al. | ................ | 123/516 |
| 5,653,103 A * | 8/1997 | Katoh | ............... | 60/283 |
| 6,273,937 B1 * | 8/2001 | Schucker | ............... | 95/45 |
| 6,622,708 B2 * | 9/2003 | Braun et al. | .................. | 123/516 |
| 6,698,475 B2 | 3/2004 | Schaefer et al. | | |
| 6,887,300 B2 * | 5/2005 | Nemser | ............... | 95/45 |
| 6,955,158 B2 | 10/2005 | Rumpf | | |
| 7,383,856 B2 | 6/2008 | Martis et al. | | |
| 7,644,702 B2 | 1/2010 | Dickenscheid et al. | | |
| 2008/0149074 A1 * | 6/2008 | Voelker | ............... | 123/511 |
| 2008/0251523 A1 | 10/2008 | Krogull et al. | | |
| 2010/0288242 A1 * | 11/2010 | Makino et al. | ................ | 123/521 |
| 2011/0135505 A1 | 6/2011 | Kieniger et al. | | |
| 2012/0186562 A1 * | 7/2012 | Achor | ............... | 123/516 |

FOREIGN PATENT DOCUMENTS

| | | |
|---|---|---|
| DE | 100 63 414 A1 | 6/2002 |
| DE | 10 2007 043 522 A1 | 3/2009 |
| DE | 10 2008 026 734 A1 | 12/2009 |
| WO | WO2007/031466 A1 | 3/2007 |

* cited by examiner

*Primary Examiner* — Mahmoud Gimie
(74) *Attorney, Agent, or Firm* — Henry M. Feiereisen LLC

(57) ABSTRACT

A fuel system, in particular of a motor vehicle, includes a fuel tank and a ventilation device for ventilating the fuel tank, wherein the ventilation device has at least one separation device which has a temporary accumulator for liquid fuel and a fuel delivery device which is configured as jet pump for delivering fuel out of the temporary accumulator. In an operating medium line of the jet pump a pressure reducing element or a pressure adjustment element is provided.

16 Claims, 3 Drawing Sheets

FUEL SYSTEM

CROSS-REFERENCES TO RELATED APPLICATIONS

This application claims the priority of German Patent Application, Serial No. 10 2010 055 317.4, filed Dec. 21, 2010, pursuant to 35 U.S.C. 119(a)-(d).

BACKGROUND OF THE INVENTION

The invention relates to a fuel system, in particular of a motor vehicle, with a fuel tank and a ventilation device for ventilating the fuel tank, wherein the ventilation device has at least one separation device which has a temporary accumulator for liquid fuel and a fuel delivery device which is configured as jet pump for delivering fuel out of the temporary accumulator.

Fuel systems of the aforementioned type are known from the state of the art. They are assigned for example to a motor vehicle or a drive system of the motor vehicle. The drive system includes in particular at least one internal combustion engine and is for example configured as hybrid drive system, i.e. it includes the internal combustion engine as well as at least one electrical machine, wherein the internal combustion engine and the electrical machine at least temporarily concertedly generate a drive torque of the drive system. The internal combustion engine is supplied with fuel from the fuel tank by the fuel system. Oftentimes, a volatile hydrocarbon fuel, for example gasoline, is used as fuel. The fuel tank therefore normally contains a volume of liquid fuel as well as a volume of gaseous fuel, which accrues in particular above the liquid fuel. The fuel tank can be a closed tank in particular a pressure tank, or a partially closed in particular also pressure free tank. The closed tank is used in particular for reducing emissions.

Due to temperature fluctuations of the fuel, for example caused by changes of the ambient temperature, pressure fluctuations can occur in the fuel tank. For this reason, the ventilation device is assigned to the fuel tank. It serves for ventilating the fuel tank. In this way, excessive pressure in the fuel tank can be reduced by the ventilating device. For this purpose the ventilation device ventilates the fuel tank for example by a ventilation line. During ventilation, gaseous as well as liquid fuel can exit the fuel tank through the ventilation device or the ventilation line. The ventilated fuel thus first exists as a mixture of gaseous and liquid fuel. This is particularly the case when the fuel tank is ventilated at a high inside pressure of the fuel tank. As a result of the high pressure or the great pressure difference between the pressure inside the fuel tank and the pressure outside of the fuel tank, the ventilated fuel has high flow velocities, which causes liquid fuel to be carried along by the gaseous fuel.

The gaseous fuel can readily be supplied to the internal combustion engine or its intake system, wherein a fuel accumulator which is preferably configured as activated carbon filter can be provided between the fuel tank and the internal combustion engine. The fuel accumulator has the purpose to temporarily store gaseous fuel, i.e. to take up gaseous fuel when unused gaseous fuel is present and to give off gaseous fuel as soon as the gaseous fuel can be discharged into the internal combustion engine. However, liquid fuel may not enter the fuel accumulator or the internal combustion engine.

For this reason, the ventilation device has the at least one separation device which serves for separating gaseous and liquid fuel. The separation device thus has the purpose to prevent the transfer of liquid fuel from the fuel tank through the ventilation device into the internal combustion engine. The separation device separates liquid fuel and allows gaseous fuel to pass. The separated liquid fuel reaches the temporary accumulator of the separation device. The term temporary accumulator does not mean that a (temporary) accumulation of the liquid fuel is indeed provided for. Rather, the liquid fuel can be discharged directly from the temporary accumulator or the separation device preferably in the direction of the fuel tank. Here, however, a rise of the fill level of the temporary accumulator may result for example due a limitation of the discharge volume flow, in particular by a line cross section or the like. The separated liquid fuel thus temporarily cannot be discharged as fast as it enters the temporary accumulator. Of course, a temporary storage of the liquid fuel, for example over a defined period of time can also be realized.

When operating the fuel system, the amount of liquid fuel present in the temporary accumulator or the separation device should be prevented from exceeding a threshold amount, i.e. from being greater than the fill level of the temporary accumulator, because this may impair the effectiveness of the separation device. The greater the amount of liquid fuel in the temporary accumulator, the greater is the risk that liquid fuel also exits the separation device together with the gaseous fuel and is carried along in the direction of the fuel accumulator or the internal combustion engine. For this reason the fuel delivery unit can be assigned to the separation device. The former is used to deliver liquid fuel out of the temporary accumulator, in particular in the direction of the fuel tank. The fuel delivery unit is usually configured as jet pump wherein fuel which is delivered by a fuel pump of the fuel system out of the fuel tank in the direction of the internal combustion engine, is often used as means for driving the jet pump. This means that the jet pump is always is operated as soon as the fuel pump is operated. The jet pump is thus operated also when liquid fuel is present in the temporary accumulator. For this reason the energy consumption of the fuel systems know from the state of the art is very high.

SUMMARY OF THE INVENTION

It is therefore the object of the invention to propose a fuel system which has a lower energy consumption wherein in particular a decrease of the energy consumption of the fuel delivery system or the jet pump, respectively relative to the fuel systems known from the state of the art is realized.

According to the invention, this is attained in that a pressure reducing element or a pressure adjustment element is provided in a. operating medium line. Via the operating medium line the operating medium, i.e. for example fuel which is delivered by the fuel pump is supplied to the jet pump. The operating medium line is thus usually configured as operating medium supply line. The pressure reducing element or the pressure adjustment element is located in the operating medium line. A reduction of the pressure of the operating medium of the jet pump can be achieved with the pressure reducing element as well as with the pressure adjustment element. The pressure change is generated with the pressure reducing element at any time, while the pressure change is adjustable when the pressure adjustment element is provided. Preferably, the pressure adjustment element is also adjustable so that no pressure reduction or pressure decrease, respectively occurs. The adjustment of the pressure of the operating medium by means of the pressure adjustment element or the adjustment of the pressure adjustment element, respectively, preferably takes place in dependence on a fuel pressure which is present at an outlet of the fuel pump or in dependence on the internal fuel tank pressure. The latter is provided in the case when a pressure tank is present. The jet pump can be operated by means of the pressure adjustment element such that in a first operating mode, a first operating medium pressure is provided, which is different from a second operating medium pressure in a second operating mode. By reducing the pressure in at least one operating mode of the fuel system, the energy consumption of the jet pump and with this the fuel system can be decreases compared to fuel systems known from the state of the art.

Because in addition, after passing through the jet pump, the operating medium is conducted back into the fuel tank possibly together with fuel which is delivered out of the temporary accumulator, and the velocity with which the delivered fuel enters the fuel tank is decreased as a result of the pressure reduction, a reduction of the gaseous fuel which accrues in the fuel tank is additionally achieved compared to fuel systems known from the state of the art, by the reduction of the pressure of the operating medium. Particularly advantageously, the operating medium line is completely closable or interruptible by means of the pressure adjustment element. This means, that operation of the jet pump can be interrupted also when the fuel pump is running, so that no fuel is delivered out of the temporary accumulator. In this way, a particularly significant reduction of the energy consumption of the fuel system is achieved. Usually, the ventilation device has at least one ventilation valve for ventilating the fuel tank through the ventilation device. It may be provided that the jet pump only operates when and/or for a defined period of time after, actuating the ventilation valve. Thus, fuel is only delivered out of the temporary accumulator during the ventilation of the fuel tank and thus liquid fuel can accumulate in the temporary accumulator.

In a refinement of the invention, an actuation device, in particular having an electromagnet, is assigned to the fuel delivery device. The actuation device serves for actuating the fuel delivery device for delivering fuel out of the temporary accumulator. The actuation device is preferably an electrical actuation device, which is operable independent of the fuel system. The actuation device can have at least one electromagnet.

In a refinement of the invention, the fuel delivery device as well as a ventilation valve for ventilating the fuel tank through the ventilation device, are actuatable by the actuation device, in particular separate from one another or jointly. The ventilation valve is assigned to the ventilation device. The ventilation valve can be adjusted so that it opens for ventilating the fuel tank or closes for interrupting the ventilation. It is for example a FTIV (Fuel Tank Isolation Valve). The ventilation valve can be configured as timing valve which allows setting discrete switching conditions (open and closed). Particularly preferably, the ventilation valve is configured as proportional valve, which does not merely allow the discrete switching states but allows adjusting the flow through cross section in multiple stages, preferably a continuous adjustment. In this way, the volume flow through the separation device can be adjusted in particular continuously, through open-loop and/or closed-loop control. The ventilation valve can be integrated with the separation device or the fuel deliver device. The ventilation valve can also be integrated in the fuel delivery device in a modular fashion.

The fuel delivery device as well as the ventilation valve are to be actuatable by the actuation device. In this respect, the actuation device is a common actuation device so that a single actuation device is sufficient to actuate the fuel delivery device as well as the ventilation valve. As described before, the ventilation valve is integrated with the fuel delivery device, i.e. are a common component. In this case, an integration of the actuation device with the ventilation valve and the fuel delivery device is also provided. The actuation can occur separate from one another or jointly. In the former case, either the fuel delivery device or the ventilation valve can be controlled separate from the respective other element. In the latter case, a simultaneous actuation of the fuel delivery device as well as the ventilation valve occurs by means of the actuation unit. The common actuation device thus allows actuating the fuel delivery device for delivering fuel out of the temporary accumulator, as well as causing the ventilation of the fuel tank by means of the ventilation valve. Particularly preferred is here the integration of fuel delivery device, ventilation valve and actuation device, because this allows the ventilation of the fuel tank as well as the emptying of the temporary accumulator with a single component which is located at lest in part in the separation device.

In a refinement of the invention the actuation device can be controlled for carrying out an actuation motion in a first direction and in a second direction which is opposite to the first direction and/or by a first lift and a second greater lift, wherein the execution of the actuation motion in the first direction or by the first lift actuate the fuel delivery unit and/or the ventilation valve and the execution of the actuation motion in the second direction or by the second lift actuate the ventilation and/or the fuel delivery device. In a first embodiment the actuation device thus carries out the actuation motion in two directions and in a second embodiment it carries out the actuation motion with two different lifts. The actuation device and the fuel delivery unit as well as the ventilation valve interact in such a manner that depending on the direction or the lift either the fuel delivery device or the ventilation valve is actuated. In this way, the actuation device can be configured as common actuation device for the fuel delivery device as well as for the ventilation valve, however, allow a separate i.e. not simultaneous actuating of fuel delivery unit and ventilation valve.

In a refinement of the invention fuel from the fuel tank is provided as operating medium of the jet pump, which fuel is deliverable in the direction of the jet pump and a fuel outlet by means of a fuel pump. The fuel pump thus serves for provide the operation means pressure of the jet pump. The fuel pump and the jet pump are in flow communication with one another via the operating medium line. The pressure reducing element or the pressure adjustment element is thus arranged fluidly between the fuel pump and the jet pump. In addition, the fuel pump usually serves for delivering fuel in the direction of the fuel outlet of the fuel system. The fuel outlet is for example assigned to an engine in particular the internal combustion engine.

In a refinement of the invention, the jet pump is operated in a first operating mode with a first operating medium pressure, which is different from an operating medium pressure in a second operating mode, wherein in the first and the second operating mode, the fuel is present at an outlet of the fuel pump with the second operating medium pressure. The fuel is thus delivered out of the fuel tank by means of the fuel pump and is brought to the second operating medium pressure, which is present at the outlet of the fuel pump. Usually, the fuel is provided to the engine at the fuel outlet with the second operating medium pressure. In contrast, the operating medium pressure of the jet pump, i.e. the first operating medium pressure, deviates from the second operating medium pressure, and is in particular lower.

In a refinement of the invention, the pressure reducing element or the pressure adjustment element are fluidly located between the outlet of the fuel pump and the jet pump.

The pressure reduction of the second operating medium pressure which is present at the outlet of the fuel pump to the first operating medium pressure which is used for operating the jet pump, is therefore to be present between the outlet of the fuel pump and an operating medium inlet of the jet pump.

In a refinement of the invention, the pressure reducing element is a throttle or the pressure adjustment element is a cross section adjustment element, in particular a cascade switch. The throttle is to have a constant flow through cross section, while the flow through cross section of the cross section adjustment element is adjustable. In particular, the flow through cross section is adjusted in such a manner that the operating medium line is interrupted or completely unobstructed. The cross section adjustment element can for example be a cascade switch. The latter is configured so that it enables or blocks respectively, a defined flow through cross section in dependence on a pressure which is present at an inlet, in particular the second operating medium pressure.

In a refinement of the invention, the at least one ventilation valve for ventilating the fuel tank through the separation device is fluidly arranged upstream or downstream of the latter. Thus, the fuel always has to pass the ventilation valve first in order to flow through the separation device. Preferably, the ventilation valve is fluidly arranged downstream of the separation device but as an alternative it can also be arranged upstream of the latter.

In a refinement of the invention at least one aeration valve which switches independence of the fuel tank fill level and/or at least one safety valve which is assigned to the fuel tank are fluidly arranged upstream of the separation device. The aeration valve is in particular configured as FLVV (Fill Limit Venting Valve). The latter allows ventilating the fuel tank so long as the fuel tank fill level is smaller than a defined fuel fill level, in particular a maximal fuel tank fill level. Ventilation of the fuel tank is thus ensured via the ventilation valve, in particular when fuel is added to the fuel tank. In addition or as an alternative, the safety valve can be provided which is configured for example as roll over safety valve or ROV (Roll Over Valve). The aeration valve as well as the safety valve are usually assigned to the fuel tank and fluidly arranged upstream of the separation device, so that the fuel first passes through the aeration valve or the safety valve, respectively, before entering the separation device.

The invention also relates to a drive system with a fuel system according to the above elaborations. The drive system has in particular at least one internal combustion engine and is for example configured as hybrid drive system.

BRIEF DESCRIPTION OF THE DRAWING

In the following, the invention is explained in more detail with reference to the exemplary embodiments shown in the drawing, without limiting the invention. It is shown in FIG. 1 a schematic representation of a fuel system in a first embodiment, FIG. 2 the fuel system in a second embodiment, and FIG. 3 a pressure adjustment element of the fuel system.

DETAILED DESCRIPTION OF PREFERRED EMBODIMENTS

Figure 1:
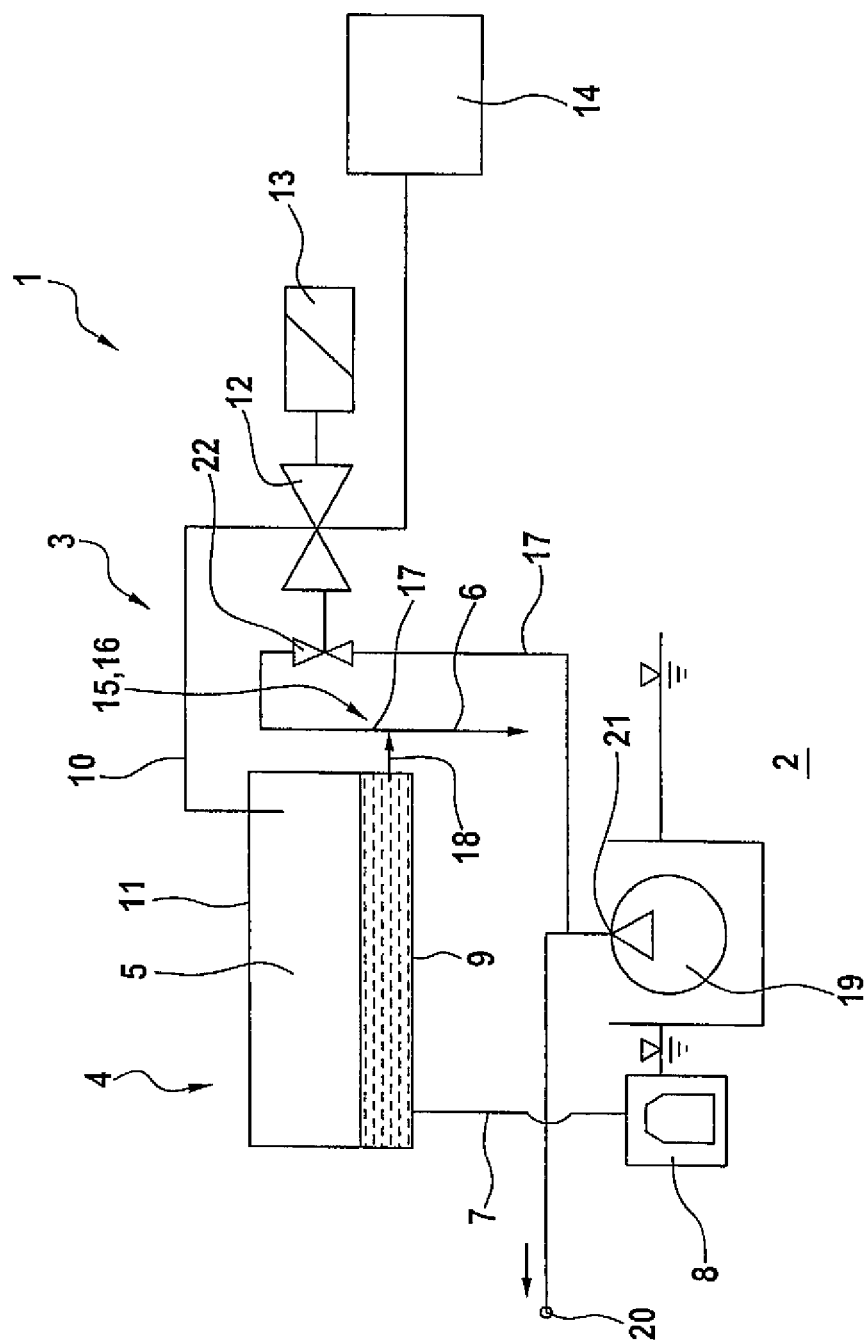

FIG. 1 shows a schematic representation of a fuel system 1. The fuel system 1 is for example part of a motor vehicle or a drive system respectively of the motor vehicle. The fuel system 1 has a fuel tank 2 and a ventilation device 3 for ventilating the fuel tank. The ventilation device has a separation device 4 with a temporary accumulator 5. The separation device 4 serves for separating liquid fuel from a mixture of liquid and gaseous fuel. The separated liquid fuel is subsequently present in the temporary accumulator 5 and can for example be conducted back into the fuel tank 2 again through a return line 6. The return line 6 preferably has a valve, in particular a drainage valve or check valve. Also, instead of the return line 6 only the valve can be provided, in particular when the separation device 4 is located at least in part in the fuel tank 2, so that fuel which escapes from the temporary accumulator 5 directly reaches the fuel tank through the valve. The valve is configured so that fuel can only leave the temporary accumulator through the return line but cannot enter the temporary accumulator. Thus, fuel in the fuel tank 2 is prevented from entering the temporary accumulator 5 through the return line 6.

The ventilation device 3 is in flow communication with the fuel tank 2 via a ventilation line 7. An aeration 8 valve which switches in dependence on the fuel tank fill level is provided on the side of the ventilation line which faces the fuel tank 2 or in the fuel tank respectively. Usually, the aeration valve 8 is configured so that it is open only when a fuel tank fill level is below a defined fuel tank fill level, in particular a maximal fuel tank fill level, i.e. fuel, in particular gaseous fuel in the fuel tank can enter the ventilation line 7. The ventilation line 7 leads into the temporary accumulator 5 of the separation device 4, preferably through a bottom 9 of the temporary accumulator 5. At a distance to the ventilation line 7 or its site of entry into the temporary accumulator 5, an outlet line 10 leads into the temporary accumulator 5, preferably through a ceiling 11 of the temporary accumulator 5. The site of entry of the outlet line 10 into the temporary accumulator 5 is thus preferably arranged so that only gaseous fuel in the temporary accumulator can enter the outlet line 10. For this, the sites of entry of outlet line 10 and ventilation line 7 are preferably arranged at opposing sides of the temporary accumulator 5. The outlet line 10 has a ventilation valve 12 which is actuatable by means of an actuation device 13. The ventilation valve 12 and the actuation device 13 are preferably configured so that the flow through cross section of the ventilation valve 12 is continuously adjustable. On the side which faces away from the separation device 4, the outlet line leads into a fuel accumulator 14 in particular an activated carbon filter. The fuel accumulator 14 serves for the temporary accumulation of gaseous fuel.

The separation device 4 is usually arranged at least in part in particular entirely in the fuel tank 2. However, an arrangement outside the fuel tank 2 is also possible. As an alternative, the separation device 4 can also be integrated in a line for example the ventilation line 7. In a preferred embodiment, the separation device is configured so that it or the ventilation device 3 respectively, has a defined pressure loss. The latter is selected so that when the fuel tank 2 is ventilated by means of the ventilation device 3 a valve which may be present, for example the aeration valve 8 is not brought into its closed position. The aeration valve 8 usually has a float, which unblocks a valve seat of the aeration valve 8 so long as the fuel tank fill level is smaller than a defined fuel tank fill level. If the volume flow which is discharged by means of the ventilation device 3, i.e. the aeration valve 8, is greater than a design volume flow, the float can be displaced into the valve seat by the volume flow or the ventilated fuel respectively, so that a further ventilation of the fuel tank 2 is not possible. This applies in particular when the ventilation valve 12 is completely opened.

Usually, the pressure loss of the ventilation device 3 is adjusted by adjusting the ventilation vale 12, for example by introducing a throttle element. Here, the pressure loss of the ventilation device 3 occurs by adjusting the separation device 4 or the pressure loss of the latter respectively, for example by providing an adjusted throttle element. The ventilation valve 12 thus preferably has no throttle element. However, the throttle element can of course be provided additionally.

In order to deliver fuel out of the temporary accumulator 5 in the direction of the fuel tank 2, the separation device 4 has a fuel delivery device 15 which is configured as jet pump 16. The jet pump 16 has an operating medium line 17 and intake line 18. When the jet pump 16 is operated, operating medium flows through the operating medium line 17. The intake line 18 leads into the operating medium line 17 in a region in which sections of the latter have a decreased cross section, so that for example a Venturi nozzle is present. The site of entry of the intake line 18 is thus usually arranged in the region of the bottom 9. The operating medium line 17 is connected to a fuel pump 19, which is assigned to the fuel tank 2 and serves for delivering fuel out of the fuel tank 2. Usually, the fuel pump 19 has the purpose to deliver the fuel in the direction of a fuel outlet 20 of the fuel system 1 as well as in the direction of the jet pump 16. The operating medium line 17 as well as the fuel outlet are thus fluidly connected to an outlet 21 of the fuel pump 19.

In the operating medium line 17, a pressure adjustment element 22 is provided which can either be a discrete valve or a proportional valve. The pressure adjustment element 23 is insofar a cross section adjustment element. The pressure adjustment element 22 serves for interrupting the operating medium line 17 or to enable it for passage of the fuel which is delivered by the fuel pump 19. When the pressure adjustment element 23 is configured as proportional valve, a first operating medium pressure which acts on the jet pump 16 is adjustable through closed-loop and/or open-loop control, while a second operating medium pressure is present at the outlet 21 of the fuel pump 19. The first operating medium pressure can be selected in dependence on the pressure which is present at the outlet 21 and/or the internal fuel tank pressure.

In the embodiment of the fuel system 1 shown in FIG. 1, the pressure adjustment element 22 as well as the ventilation valve 12 are actuatable by means of the actuation device. For this purpose, the actuation device 13 can for example be configured to carry out actuation motions in a first direction and in a second direction which is opposite to the first direction. As an alternative, the actuation device 13 can also be provided for carrying out an actuation motion by a first lift or by a second greater lift. Carrying out the actuation motion in the first direction or by the first lift actuates the fuel delivery device 15 by means of the pressure adjustment element and carrying out the actuation motion in the second direction or by the second lift actuates the ventilation valve 12 or vice versa. Of course, the actuation device can also be configured only for a joint and simultaneous actuation of the ventilation valve 12 and the fuel delivery device 15. In this case, the operating medium line 17 is enabled by means of the pressure adjustment element 22 only when the ventilation of the fuel tank 2 occurs by means of the ventilation valve 12, so that only in this case fuel the fuel delivery device is operated for delivering fuel out of the temporary accumulator 5 in the direction of the fuel tank 2. In this way, the operation of the jet pump 16 or the fuel delivery device 15 respectively, takes place only when this is actually required In this way, the energy consumption of the fuel delivery device 15 and with this the fuel system 1 can be reduced compared to systems known from the state of the art.

Figure 2:
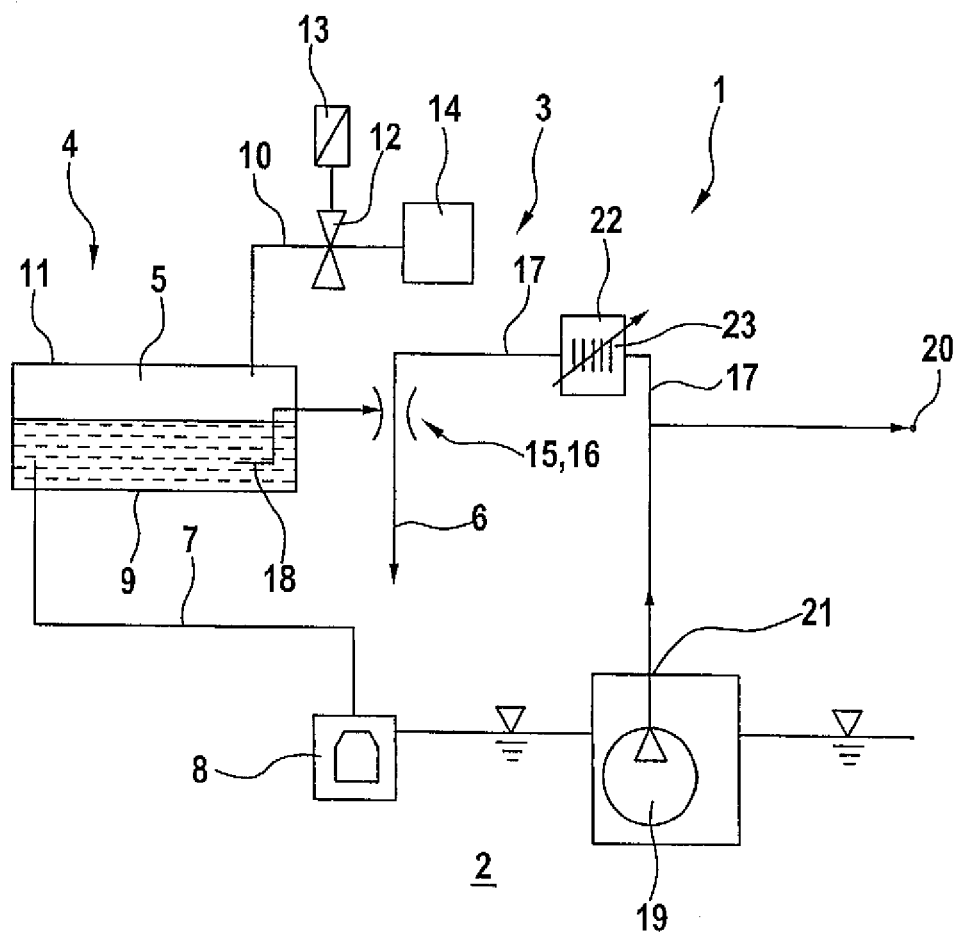

FIG. 2 shows a further embodiment of the fuel system 1. The construction of the fuel system shown in FIG. 2 corresponds to the one described with reference to FIG. 1, so that insofar, reference is being made to the above elaborations. However, in the embodiment in FIG. 2 there is no operative connection between the actuation device 13 and the pressure adjustment element 22. Rather, the pressure adjustment element 22 is configured as passive cross section adjustment element, in particular as cascade switch 23. In dependence on the second operating medium pressure which is generated by the fuel pump 19, the cascade switch 23 adjusts a defined flow through cross section and with this the first operating medium pressure which is present at the jet pump 16. In particular, the higher the second operating medium pressure generated by the fuel pump 19, the smaller the flow through cross section. In this way, the energy required by the jet pump 16 and with this the fuel system 1 can be significantly reduced. Instead of the pressure adjustment element 22 a pressure reducing element (not shown here) can of course also be provided. The latter has a nonadjustable cross section and serves for reducing the second operating medium pressure to the first operating medium pressure.

Figure 3:
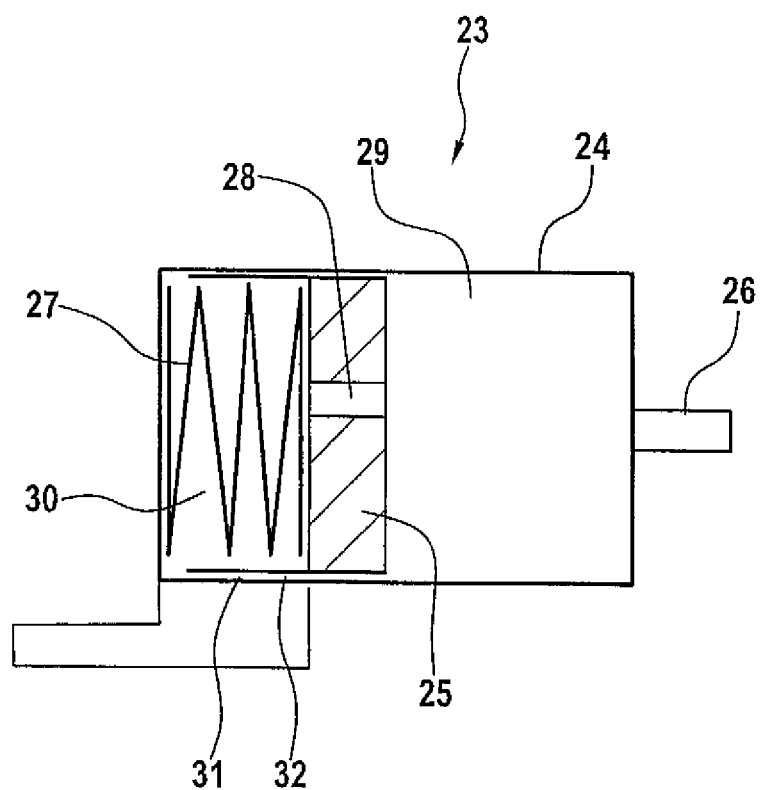

FIG. 3 shows the cascade switch 23. It is clear that the cascade switch 23 is made of a cylinder 24 and a piston 25 mounted in the latter for longitudinal movement. The second operating medium pressure is present at an inlet 26 of the cascade switch; the inlet 26 is thus in flow communication with the fuel pump. A spring force which is generated by a spring 27 acts in opposition to the force which is applied by the second operating medium pressure on the piston 25. The spring force 27 insofar urges the piston 25 in the direction of the inlet 26. The higher the second operating medium pressure, the further the piston is urged in the direction of the spring 27 and the latter thereby compressed. Through a recess 28 which traverses the piston 25, operating medium can move from a first chamber 29 which is in flow communication with the inlet 26, into a second chamber 30. The chambers 29 and 30 are otherwise separated from one another by the piston 25. The second chamber 30 is in flow communication with an outlet 31 and the latter is in flow communication with the jet pump 16. FIG. 3 makes clear that the more the piston 25 is urged in the direction of the spring 27 the more it covers a flow through cross section 32 of the outlet 31. Thus the higher the operating medium pressure which is present at the inlet 26 is, the smaller the flow through cross section 33 becomes. In this way, a passive adjustment of the first operating medium pressure which is present at the jet pump 16 is achieved in dependence on the second operating medium pressure. If the fuel tank 2 is a pressure tank, the second operating medium pressure can correspond to the internal fuel tank pressure.

The invention claimed is:

1. A fuel system, comprising:
   a fuel tank;
   a ventilation device for ventilating the fuel tank, said ventilation device having at least one separation device, said separation device having a temporary accumulator for liquid fuel and a fuel delivery device for delivering fuel out of the temporary accumulator, said fuel delivery device being configured as a Jet pump, said jet pump having an operating medium line;
   a pressure reducing element or a pressure adjustment element which is provided in the operating medium line of the jet pump; and
   an actuation device which is assigned to the fuel delivery device and controllable for implementing an actuation motion in a first direction and in a second direction which is opposite to the first direction and/or for implementing a first lift and a second lift which is greater than the first lift, wherein the actuation motion in the first or second direction or by the first or second lift actuates the fuel delivery device and/or a ventilation valve for ventilating the fuel tank by the ventilation device.

2. The fuel system of claim 1 for use in a in a motor vehicle.

3. The fuel system of claim 1, wherein the actuation device has at least one electromagnet.

4. The fuel system of claim 1, wherein the fuel delivery device and the ventilation valve are actuatable by the actuation device.

5. The fuel system of claim 4, wherein the fuel delivery device and the ventilation valve are actuatable jointly or separate from one another.

6. The fuel system of claim 1, wherein the actuation motion in the first direction or the first lift actuates the fuel delivery device and the actuation motion in the second direction or the second lift actuates the ventilation valve.

7. The fuel system of claim al 1, further comprising a fuel outlet and a fuel pump, wherein fuel from the fuel tank is used as operating medium for the jet pump, said fuel being deliverable in a direction of the jet pump and the fuel outlet by means of the fuel pump.

8. The fuel system of claim 7, wherein the fuel pump has an outlet, wherein the fuel pump is operated in a first operating mode with a first operating medium pressure, said first operating medium pressure being different from a second operating medium pressure in a second operating mode, and wherein the fuel at the outlet has the second operating medium pressure.

9. The fuel system of claim 7, wherein the pressure reducing element or the pressure adjustment element are fluidly provided between the outlet of the fuel pump and the jet pump.

10. The fuel system of claim 1, wherein the pressure reducing element is a throttle.

11. The fuel system of claim 1, wherein the pressure adjustment element is a cross section adjustment element.

12. The fuel system of claim 1, wherein the cross section adjustment element is a cascade switch.

13. The fuel system of claim 1, wherein the at least one ventilation valve is fluidly arranged upstream or downstream of the separation device for ventilating the fuel tank by the separation device.

14. The fuel system of claim 1, further comprising at least one member selected from the group consisting of an aeration valve which switches in dependence on the fill level of the fuel tank and a safety valve which is assigned to the fuel tank, wherein the member is fluidly arranged upstream of the separation device.

15. A fuel system, comprising:
a fuel tank;
a ventilation device for ventilating the fuel tank, said ventilation device having at least one separation device said separation device having a temporary accumulator for liquid fuel and a fuel delivery device for delivering fuel out of the temporary accumulator, said fuel delivery device being configured as a jet pump, said jet pump having an operating medium line;
a pressure reducing element or a pressure adjustment element which is provided in the operating medium line of the jet pump, and
a fuel outlet and a fuel pump, wherein fuel from the fuel tank is used as operating medium for the jet pump, said fuel being deliverable in a direction of the jet pump and the fuel outlet by means of the fuel pump,
wherein the fuel pump has an outlet, wherein the fuel pump is operated in a first operating mode with a first operating medium pressure, said first operating medium pressure being different from a second operating medium pressure in a second operating mode, and wherein the fuel at the outlet has the second operating medium pressure.

16. The fuel system of claim 15, wherein the pressure reducing element or the pressure adjustment element are fluidly provided between the outlet of the fuel pump and the jet pump.

* * * * *